(12) United States Patent
Rieder et al.

(10) Patent No.: US 7,658,115 B2
(45) Date of Patent: Feb. 9, 2010

(54) MEASURING TRANSDUCER OF VIBRATION-TYPE

(75) Inventors: Alfred Rieder, Landshut (DE); Michael Fuchs, Eschbach (DE); Wolfgang Drahm, Freising (DE); Leonhard Probst, Hochwald SO (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 12/289,169

(22) Filed: Oct. 22, 2008

(65) Prior Publication Data

US 2009/0145244 A1 Jun. 11, 2009

Related U.S. Application Data

(60) Provisional application No. 60/960,928, filed on Oct. 22, 2007.

(30) Foreign Application Priority Data

Oct. 22, 2007 (DE) .................. 10 2007 050686

(51) Int. Cl.
*G01F 1/84* (2006.01)
(52) U.S. Cl. ............................ 73/861.355
(58) Field of Classification Search ........... 73/861.355, 73/861.356, 861.357
See application file for complete search history.

(56) References Cited

U.S. PATENT DOCUMENTS 3,329,019 A 7/1967 Sipin

| 4,491,025 | A | * | 1/1985 | Smith et al. ............ 73/861.355 |
| 5,291,792 | A | | 3/1994 | Hussain |
| 6,487,917 | B1 | * | 12/2002 | Van Cleve et al. ..... 73/861.357 |
| 6,840,109 | B2 | * | 1/2005 | Drahm et al. .................. 73/650 |
| 2006/0173639 | A1 | | 8/2006 | Carpenter |

FOREIGN PATENT DOCUMENTS

| DE | 103 51 311 B3 | 6/2005 |
| DE | 10 2004 030 392 A1 | 1/2006 |
| EP | 0 759 542 A1 | 2/1997 |
| EP | 1 055 101 B1 | 11/2000 |
| FR | 2 598 801 | 11/1987 |
| JP | 11211530 A | 8/1999 |
| JP | 2000 249 585 A | 9/2000 |
| JP | 2006 292515 A | 10/2006 |
| WO | WO 2007/130024 A1 | 11/2007 |

\* cited by examiner

*Primary Examiner*—Jewel Thompson
(74) *Attorney, Agent, or Firm*—Bacon & Thomas, PLLC

(57) ABSTRACT

A measuring transducer includes: a measuring tube vibrating at least at times and serving for conveying medium to be measured; a counteroscillator, which is affixed to the measuring tube on an inlet-side, to form a first coupling zone, and to the measuring tube on an outlet-side, to form a second coupling zone; an exciter mechanism for driving at least the measuring tube; as well as a sensor arrangement for registering oscillations at least of the measuring tube. During operation, the measuring tube executes, at least at times and/or at least in part, bending oscillations about an imaginary bending oscillation axis, which imaginarily connects the two coupling zones with one another. Additionally, at least a first spring element and a second spring element are included, with each of the at least two spring elements being affixed to the measuring tube and the counteroscillator spaced both from each of the two coupling zones as well as also from the exciter mechanism.

41 Claims, 7 Drawing Sheets

Section A-A

Section A-A

Section A-A

MEASURING TRANSDUCER OF VIBRATION-TYPE

FIELD OF THE INVENTION

The invention relates to a measuring transducer of the vibration-type, especially a measuring transducer suited for application in a Coriolis mass flow meter. The measuring transducer includes: at least one measuring tube, vibrating at least at times, for conveying medium to be measured; a counteroscillator, which is affixed to the measuring tube on an inlet side of the measuring tube to form a first coupling zone and at an outlet side of the measuring tube to form a second coupling zone; an exciter mechanism for driving at least the measuring tube; and a sensor arrangement for registering oscillations at least of the measuring tube.

BACKGROUND OF THE INVENTION

Often used in industrial measurements technology, especially in connection with control and monitoring of automated, technical processes, for ascertaining characteristic process parameters, for example a mass flow, a density, a viscosity, etc., of media flowing in a pipeline, for example liquids and/or gases, are in-line measuring devices, especially in-line measuring devices in the form of mass flow meters, which, by means of a measuring transducer of vibration-type and an operating and evaluating electronics connected thereto, induce forces in the flowing medium, for example Coriolis forces, and derived from these, produce a measurement signal representing at least one parameter. Such in-line measuring devices having a measure transducer of vibration-type are long known and well established in industrial usage. Examples of such measuring transducers, especially also their application in Coriolis mass flow meters, are described e.g. in EP-A 317 340, U.S. Pat. No. 4,823,614, U.S. Pat. No. 5,291,792, U.S. Pat. No. 5,398,554, U.S. Pat. No. 5,476,013, U.S. Pat. No. 5,602,345, U.S. Pat. No. 5,691,485, U.S. Pat. No. 5,796,010 U.S. Pat. No. 5,796,012, U.S. Pat. No. 5,945,609, U.S. Pat. No. 5,979,246, U.S. Pat. No. 6,397,685, U.S. Pat. No. 6,691,583, U.S. Pat. No. 6,840,109, U.S. Pat. No. 7,077,014, U.S. Pat. No. 7,017,424, US-A 2007/0186685, US-A 2007/0119265, US-A 2007/0119264, WO-A 99 40 394, WO-A 01 02 816 or WO-A 00 14 485.

Each of the measuring transducers shown therein includes at least one, essentially straight, measuring tube, which vibrates during operation and serves for conveying the medium. The measuring tube communicates with the pipeline via an inlet tube piece on the inlet side of the measuring tube and an outlet tube piece on the outlet side of the measuring tube.

Additionally, each of the disclosed measuring transducers includes at least one counteroscillator, which is embodied as one piece or multi-piece, coupled to the measuring tube on the inlet side to form a first coupling zone and on the outlet side to form a second coupling zone, and likewise caused to vibrate, at least in part, during operation. In the case of the measuring transducers shown in U.S. Pat. No. 5,291,792, U.S. Pat. No. 5,796,010, U.S. Pat. No. 5,945,609, U.S. Pat. No. 7,077,014, US-A 2007/0119262, WO-A 01 02 816 or also WO-A 99 40 394 having a single, essentially straight, measuring tube, such tube and the counteroscillator are, as quite usual in the case of conventional, industrial-grade measuring transducers, directed essentially coaxially with one another. Moreover, in the case of commonly marketed measuring transducers of the aforementioned kind, also the counteroscillator is, most often, essentially tubular and essentially straight and, additionally, arranged in the measuring transducer in such a manner that the measuring tube is at least partially surrounded by the counteroscillator, and such that measuring tube and counteroscillator are essentially coaxially directed.

Measuring transducers of the kind discussed here include, additionally, an exciter mechanism, which, driven by an appropriately conditioned electrical driver signal, excites the measuring tube during operation by means of at least one electromechanical, especially electrodynamic, oscillation exciter to execute bending oscillations, usually, as much as possible, predominantly or exclusively, in a single, imaginary, tube oscillation plane, hereinafter referred to as the primary plane of oscillation and imaginarily passing through the two coupling zones. Additionally, such measuring transducers include a sensor arrangement having oscillation sensors, especially electrodynamic oscillation sensors, for the at least pointwise registering of inlet-side and outlet-side oscillations of the measuring tube and for producing electrical, sensor signals influenced by the mass flow.

The exciter mechanism includes at least one electrodynamic, oscillation exciter and/or an oscillation exciter differentially acting on measuring tube and counteroscillator, while the sensor arrangement includes an inlet-side, most often likewise electrodynamic, oscillation sensor, as well as an outlet-side, oscillation sensor of essentially equal construction. In the case of usually marketed measuring transducers having a single measuring tube and a counteroscillator coupled thereto, the oscillation exciter is formed usually by means of a coil, through which an electrical current flows, at least at times, and through which a magnetic field passes, at least at times, as well as by means of an armature interacting with, especially plunging in, the at least one coil. Additionally, in the case of conventional measuring transducers, the exciter mechanism is usually constructed and placed in the measuring transducer in such a manner that it acts essentially centrally on the measuring tube. Most often, the at least one oscillation exciter and, as a result, the exciter mechanism, is, in such case, additionally, as shown, for example, also in the measuring transducers disclosed in U.S. Pat. No. 5,796,010, U.S. Pat. No. 6,840,109, U.S. Pat. No. 7,077,014 or U.S. Pat. No. 7,017,424, affixed externally to the measuring tube, at least pointwise along an imaginary, central, peripheral line thereof, while, for example, in the case of U.S. Pat. No. 4,823,614, the exciter mechanism is formed by means of two oscillation exciters affixed to the measuring tube, but not in the center of thereof.

In the case of most measuring transducers of the described kind, the oscillation sensors of the sensor arrangement, as already indicated, are constructed on the basis of the same principle as used for the aforementioned oscillation exciter. Accordingly, also the oscillation sensors of such a sensor arrangement are formed, most often, in each case, by means of at least one coil usually affixed to the counteroscillator. At least at times, a magnetic field also passes through this coil. Additionally, these oscillation sensors each also include an armature, which is affixed to the measuring tube and interacts with the at least one coil. Each of the aforementioned coils is, additionally, connected by at least one pair of electrical connection lines with the mentioned operating- and evaluating-electronics of the in-line measuring device. The connection lines are usually guided on the shortest possible path from the coils, along the counteroscillator, to the transducer housing. Besides the oscillation sensors provided for registering vibrations of the measuring tube, the measuring transducer can, as also proposed, among other things, in EP 831 306, U.S. Pat. No. 5,736,653, U.S. Pat. No. 5,381,697 or WO-A 01/02 816, include still other sensors arranged on the inner part formed, in any case, by means of measuring tube, counteroscillator, as well as the exciter mechanism and sensor arrangement provided, in each case, thereon or also in their proximity, and serving especially for registering rather secondary measured variables, such as e.g. temperature, acceleration, strain, stress, etc.

Finally, each of the measuring transducers shown in U.S. Pat. No. 5,291,792, U.S. Pat. No. 5,945,609, U.S. Pat. No. 7,077,014, US-A 2007/0119264, WO-A 01 02 816 or also WO-A 99 40 394 includes an extra, transducer housing surrounding the measuring tube, with counteroscillator coupled thereto, as well as the provided exciter mechanism and sensor arrangement, especially such a transducer housing affixed directly to the inlet tube piece and to the outlet tube piece, while, for example, in the case of the measuring transducer shown in U.S. Pat. No. 4,823,614, the transducer housing is formed quasi by the counteroscillator, or, in other words, transducer housing and counteroscillator are one and the same component.

An advantage of measuring transducers with straight measuring tube, in comparison to those with curved, or angled, measuring tube is e.g. that the straight measuring tube empties to a high degree of certainty in almost any installed orientation, especially also following an in-line-conducted cleaning. Additionally, such measuring tubes are significantly easier and accordingly more cost favorable to manufacture, as compared e.g. to a curved measuring tube, while, in operation, they, most often, result in a lesser pressure drop.

A straight measuring tube, as is known, brings-about Coriolis forces, when it is excited to execute bending oscillations in the primary oscillation plane according to a first form of eigenoscillation—the so-called drive-mode, or also, wanted-mode. In the case of conventional measuring transducers of the aforementioned type, for example also those disclosed in U.S. Pat. No. 5,291,792, U.S. Pat. No. 6,840,109, U.S. Pat. No. 7,077,014 or U.S. Pat. No. 7,017,424, when the measuring tube is caused to oscillate in the wanted mode mainly in the imaginary, primary plane of oscillation, these Coriolis forces lead, in turn, to the fact that, superimposed on the same bending oscillations in the wanted mode are coplanar (thus, executed likewise in the primary plane of oscillation) bending oscillations according to a second form of eigenoscillation of, most often, higher order, in any case, however, of other symmetry characteristics (the so-called Coriolis—, or also, measuring-mode). As a result of the bending oscillations in the Coriolis mode, the oscillations registered inlet-side and outlet-side by means of the sensor arrangement exhibit a measurable phase difference dependent also on mass flow.

Usually, the measuring tubes of such measuring transducers, especially those utilized in Coriolis mass flow meters, are excited in the wanted mode to an instantaneous resonance frequency of the first form of eigenoscillation, especially at oscillation amplitude controlled to be constant. Since this resonance frequency depends, especially, also on the instantaneous density of the medium, at least also the density of flowing media can be directly measured by means of usually marketed Coriolis, mass flow meters.

A special problem of measuring transducers as above described with straight measuring tube lies, however, therein (and this is also discussed, for example, in U.S. Pat. No. 5,291,792 or U.S. Pat. No. 7,077,014), that they exhibit not only the above-discussed, natural modes of oscillation, in which the measuring tube executes bending oscillations in the mentioned, primary plane of oscillation, but, instead, also natural modes of oscillation, in which the measuring tube can execute bending oscillations in another imaginary, secondary plane of oscillation essentially orthogonal to the primary plane of oscillation and equally imaginarily cutting through the two coupling zones, and that, without the accessing of special measures, these modes of oscillation in the secondary plane of oscillation can naturally exhibit about the same resonance frequency as possessed by the respectively corresponding mode of oscillation in the primary plane of oscillation.

In other words, in the case of measuring transducers of the type being discussed, with straight measuring tube, possible inaccuracies of measurement can result from the fact that, in addition to the desirably excited, wanted mode in the primary plane of oscillation, undesired and, thus, disturbing oscillations occur in the secondary plane of oscillation and lie close to the frequencies of oscillation of the wanted mode. Equally as for the wanted mode in the primary plane of oscillation, there would then also be induced, for the equal-frequency modes of oscillation in the secondary plane of oscillation excited in undesired manner, additional modes of oscillation coplanar therewith, related to corresponding Coriolis forces. A cause of such disturbances can be, for example, vibrations in the connected pipeline or, also, most-often broadband noise stemming from the flowing medium.

As a result of, in practice, almost unavoidable, transverse sensitivities of the oscillation sensors to oscillations in the secondary plane of oscillation, this leads to the fact that the sensor signals delivered under such circumstances reflect, in part, both oscillations of the measuring tube in the primary plane of oscillation as well as also corresponding oscillations of the measuring tube in the secondary plane of oscillation, to a degree significant for accuracy of measurement. A matching of the corresponding signal parts to the primary and secondary planes of oscillation is, practically, not possible, because the oscillations have essentially equal frequencies.

Moreover, in the case of sufficiently strong, mechanical coupling of the oscillatory modes of the two planes of oscillation, also a transfer of oscillatory energy is possible, spontaneously or periodically, from the primary into the secondary plane of oscillation, or also the other way around, from the secondary into the primary plane of oscillation. As a result of this, the sensor signals can exhibit, for example, a characteristic beat quite damaging both for their signal processing as well as also for oscillation control based on the sensor signals. Furthermore, oscillatory motions in the secondary plane of oscillation, be they excited directly by external disturbances or indirectly via the aforementioned energy transfer from the primary into the secondary plane of oscillation, can lead to the fact that the sensor signals can exhibit an, at times, overly high signal level, with the result that the input amplifier receiving and processing the sensor signals must be, correspondingly, over dimensioned and, consequently, comparatively expensive.

For suppressing such, on the whole, very damaging oscillations executed in the secondary plane of oscillation, it is usual to increase a stiffness of the measuring tube effective for these oscillations relative to a stiffness of the measuring tube effective for oscillations in the primary plane of oscillation, while keeping effective masses essentially equal, and, so, to effectively separate from one another, resonance frequencies of corresponding modes of oscillation of primary and secondary planes of oscillation. Typically, in such case, frequency separations of more than 30 Hz are sought.

In the case of U.S. Pat. No. 5,602,345, for this, it is proposed, for example, to apply spring elements in the form of flat struts placed additionally on the particular measuring tube on the inlet and outlet sides in the immediate vicinity of the respective coupling zones. A further possibility for separating oscillation modes in the primary plane of oscillation from corresponding modes of oscillation in the secondary plane of oscillation is additionally disclosed in U.S. Pat. No. 5,291, 792. In the measuring transducer proposed there, the stiffness of the measuring tube effective for oscillations in the secondary plane of oscillation is increased by biasing the measuring tube at its center with a correspondingly acting, spring element in the form of an, in such case, U-shaped, stiffening spring arranged extending in the measuring transducer essentially in radial direction to measuring tube and counteroscillator. This spring element does not influence the stiffness of the measuring tube for the Coriolis mode in the primary plane of oscillation to any extent worth mentioning. In this way, it is possible to achieve that the oscillation frequency of oscillations in the wanted mode rises sufficiently strongly above the frequency of undesired, thus disturbing, oscillations, so that the influence of such disturbing oscillations is largely suppressed.

A disadvantage of such centrally acting, stiffening springs accessing the measuring tube in a rather pointwise manner is that unreducedly asymmetric modes of oscillation can be excited in the secondary plane of oscillation, such as, for instance, the counterpart of the Coriolis mode in the primary plane of oscillation, accompanied by the above-described disadvantages. Moreover, such a stiffening spring acting centrally, thus at the location of maximum oscillation amplitude, must be designed to be correspondingly mechanically stable and correspondingly oscillation resistant. On the other hand, however, also the struts proposed in U.S. Pat. No. 5,602,345 can be secured and adjusted only with relatively high effort, especially also in the case of application of this principle to a single measuring tube with tubular counteroscillator arranged coaxially thereto.

SUMMARY OF THE INVENTION

An object of the invention is to improve measuring transducers of the aforementioned type having a measuring tube vibrating at least at times and a counteroscillator affixed to the measuring tube on inlet and outlet sides, toward the goal of separating the resonance frequencies of the modes of oscillation in the primary and secondary planes of oscillations yet more efficiently in comparison to the solutions discussed above, while keeping manufacturing effort at comparable or lesser levels, at least compared to the above-mentioned struts.

For achieving the object, the invention resides in a measuring transducer of vibration-type for a medium flowing in a pipeline. The measuring transducer includes: a measuring tube vibrating, at least at times, and serving for conveying medium to be measured; a counteroscillator, which is affixed to the measuring tube on its inlet side for forming a first coupling zone and to the measuring tube on its outlet side for forming a second coupling zone; an exciter mechanism for driving at least the measuring tube, especially an exciter mechanism acting essentially centrally on the measuring tube and/or affixed externally to the measuring tube at least pointwise along an imaginary, central, peripheral line of the measuring tube; as well as a sensor arrangement for registering oscillations at least of the measuring tube; wherein the measuring tube executes during operation, at least at times and/or at least in part, bending oscillations about an imaginary bending oscillation axis connecting the two coupling zones imaginarily with one another. The measuring transducer of the invention includes, additionally, a first spring element and a second spring element, wherein each of the at least two spring elements is affixed to measuring tube and counteroscillator spaced from each of the two coupling zones as well as also from the exciter mechanism.

Beyond this, the invention resides in an in-line measuring device, for example one embodied as a Coriolis mass flow measuring device, density measuring device, viscosity measuring device, or the like, for measuring and/or monitoring at least one parameter, for example a mass flow, e.g. mass flow rate, a density and/or a viscosity of a medium flowing in a pipeline, in which in-line measuring device a measuring transducer of the above-defined kind is applied.

The measuring transducer is, especially, further so embodied that it has at least a first, natural mode of oscillation, in which at least the measuring tube can execute bending oscillations in an imaginary, primary plane of oscillation. Moreover, the measuring transducer is additionally so embodied that it has a second, natural mode of oscillation, in which at least the measuring tube can execute bending oscillations in an imaginary, secondary plane of oscillation essentially orthogonal to the imaginary, primary plane of oscillation. Developing this aspect of the measuring transducer of the invention further, it is provided that the measuring tube is excited, at least at times during operation, by means of the exciter mechanism in such a manner that the measuring tube oscillates at least partially, especially predominantly or exclusively, in the imaginary primary plane of oscillation.

In a first embodiment of the invention, it is provided that, by means of the two spring elements, a lowest eigenfrequency of the first natural mode of oscillation is set smaller than a lowest eigenfrequency of the second natural mode of oscillation. Developing this embodiment of the invention further, the spring elements are additionally so embodied and arranged in the measuring transducer that a frequency separation between the lowest eigenfrequency of the first natural mode of oscillation and the lowest eigenfrequency of the second natural mode of oscillation is a set greater than 50 Hz, especially greater than 100 Hz.

In a second embodiment of the invention, each of the two spring elements has a spring stiffness, of which, in each case, a primary component constraining bending oscillations of the measuring tube in the primary plane of oscillation is different from a secondary component constraining bending oscillations of the measuring tube in the secondary plane of oscillation. Developing this embodiment of the invention further, each of the two spring elements is additionally so embodied and arranged in the measuring transducer that the primary component of its spring stiffness is, in each case, smaller than the associated secondary component.

In a third embodiment of the invention, it is further provided that each of the two spring elements is seated, in part, on imaginary points of intersection of the measuring tube with the secondary plane of oscillation. Alternatively thereto or in supplementation thereof, additionally each of the two spring elements is seated, in part, on imaginary points of intersection of the counteroscillator with the secondary plane of oscillation.

In a fourth embodiment of the invention, the exciter mechanism includes at least one oscillation exciter, especially a single oscillation exciter and/or an oscillation exciter formed by means of a coil.

In a fifth embodiment of the invention, the exciter mechanism includes at least one oscillation exciter, especially a single oscillation exciter and/or an oscillation exciter formed by means of a coil, and it is further provided that the first spring element is affixed to measuring tube and counteroscillator in a region lying on the inlet side between the first coupling zone and the at least one oscillation exciter. Developing this embodiment of the invention further, it is additionally provided that the first spring element is affixed to measuring tube and counteroscillator spaced from the second spring element. In supplementation thereof, a further development of the invention additionally provides that the second spring element is accordingly affixed to measuring tube and counteroscillator in a region lying on the outlet-side between the second coupling zone and the at least one oscillation exciter. In supplementation thereof, a further development of the invention additionally provides that the two spring elements are arranged in the measuring transducer in a flat cutting plane of the measuring tube imaginarily extending through the inlet-side region and the outlet-side region.

In a sixth embodiment of the invention, it is provided that the two spring elements are arranged point-symmetrically with reference to a center of gravity of the measuring tube in the measuring transducer.

In a seventh embodiment of the invention, it is provided that the exciter mechanism includes at least one coil. Developing this embodiment of the invention further, it is additionally provided that the at least one coil of the exciter mechanism is mechanically connected, especially rigidly coupled, with the counteroscillator.

In an eighth embodiment of the invention, the sensor arrangement includes an inlet-side, first oscillation sensor, especially one formed by means of a coil, as well as an outlet-side, second oscillation sensor, especially one formed by means of a coil. Developing this embodiment of the invention further, it is additionally provided that the first spring element and the first oscillation sensor are affixed to the measuring tube, in each case, in part, along at least one common, inlet-side, peripheral line of the measuring tube, and that the second spring element and the second oscillation sensor are affixed to the measuring tube, in each case, in part, along at least one common, outlet-side, peripheral line of the measuring tube.

In a ninth embodiment of the invention, the exciter mechanism is fed, at least at times during operation, by an electrical, driver signal.

In a 10th embodiment of the invention, the measuring transducer includes a transducer housing.

In an 11th embodiment of the invention, it is provided that the measuring tube and counteroscillator are directed essentially coaxially with respect to one another.

In a 12th embodiment of the invention, it is provided that the measuring tube is at least partially surrounded by the counteroscillator.

In a 13th embodiment of the invention, it is provided that the counteroscillator is essentially tubular.

In a 14th embodiment of the invention, it is provided that the counteroscillator is essentially straight.

In a 15th embodiment of the invention, the measuring tube is essentially straight. Developing this embodiment of the invention further, it is additionally provided that also the counteroscillator executes bending oscillations about the bending oscillation axis, at least at times during operation, and that the spring elements are affixed to the counteroscillator along a neutral fiber of the counteroscillator essentially non-deforming in the counteroscillator undergoing bending oscillations. Alternatively to or in supplementation of this further development of the invention, it is additionally provided that the measuring tube executes, at least at times during operation, torsional oscillations about a torsional oscillation axis essentially parallel to, especially coinciding with, the bending oscillation axis.

In a 16th embodiment of the invention, the measuring tube extends with essentially constant cross section, especially with a cross section of circular shape, between the two coupling zones.

In a 17th embodiment of the invention, the measuring tube has an essentially cylindrical shape.

In an 18th embodiment of the invention, the spring elements are, in each case, affixed to the measuring tube with a measuring-tube-side, first end, especially with the formation, in each case, of a rigid and/or play-free, seating, and to the counteroscillator with a counteroscillator-side, second end, especially with formation, in each case, of a rigid and/or play-free seating.

In a 19th embodiment of the invention, each of the spring elements, especially spring elements which are of equal construction, is, in each case, formed by means of a bar, especially a metal bar and/or a bar arranged extending in the measuring transducer radially directed towards the measuring tube and/or counteroscillator.

In a 20th embodiment of the invention, the measuring transducer includes, additionally, a third spring element and a fourth spring element, with each of the four spring elements being affixed to measuring tube and counteroscillator spaced from the coupling zones and the exciter mechanism. Developing this embodiment of the invention further, it is additionally provided that each of the four spring elements, especially four spring elements of equal construction, in each case is spaced from each of the respectively other, three spring elements.

In another embodiment of the invention, it is additionally provided that pair-wise associated, inlet-side spring elements are, in each case, placed essentially diametrically opposite to one another on the measuring tube and pair-wise associated, outlet-side spring elements are, in each case, placed lying essentially diametrically opposite to one another on the measuring tube.

In a 21st embodiment of the invention, the measuring tube communicates with a pipeline via an inlet-side-opening, inlet tube piece and via an outlet-side-opening, outlet tube piece. Developing this embodiment of the invention further, it is further provided that the measuring transducer additionally includes a transducer housing affixed to the inlet tube piece and to the outlet tube piece.

A basic idea of the invention is, among other things, to apply, instead of spring elements acting only centrally on the measuring tube, spring elements acting remotely both from the center as well as also from the aforementioned coupling zones and so to suppress, besides symmetric disturbances, also asymmetric disturbances. This has the advantage that, in this way, also disturbances of the, most often, asymmetrically formed measuring mode, for example as a result of time varying forces acting from one side on the in-line measuring device inserted in the pipeline and/or gyrating movements of the in-line measuring device about one of its principle axes of inertia, can be very effectively suppressed in very simple manner. Additionally, the axis of oscillation is very clearly defined by the spring elements and held locationally fixed, to the greatest possible extent, even in the case of possible external disturbances.

An especially effective frequency separation can, in such case, be achieved, for example, by application of spring elements embodied with essentially rod or bar shape, so arranged in the measuring transducer that they extend essentially in the secondary plane of oscillation. A relative movement between canceling tube and measuring tube perpendicular to the wanted and Coriolis modes in the primary plane of oscillation is, in this way, essentially blocked. This is especially true when such spring elements are so arranged in the measuring transducer that they extend essentially radially with respect to the measuring tube and/or counteroscillator. Additionally, bar-shaped spring elements can be cost-effectively manufactured and mounted, especially in comparison to the mentioned struts affixed terminally to the measuring tube, with the manner in which they work being clearly more efficient in comparison to spring elements as conventionally applied.

For the case in which the spring elements are so arranged in the measuring transducer that each acts directly on a peripheral line of the measuring tube, along which also its associated oscillation sensor is placed, at least such relative movements between measuring tube and counteroscillator can be almost completely excluded. This leads to the additional advantage that disturbances acting from the exterior in the secondary direction of oscillation on the oscillation sensor can no longer produce any disturbance signal worth mentioning, even when the sensor might have a certain transverse sensitivity in this direction of oscillation.

BRIEF DESCRIPTION OF THE DRAWINGS

The invention and advantageous embodiments thereof will now be explained on the basis of an example as illustrated in the figures of the drawing; equal parts are provided with equal reference characters in the figures. In case supportive of clarity, already mentioned reference characters are not repeated in subsequent figures. The figures show as follows.

DETAILED DESCRIPTION OF EXEMPLARY EMBODIMENTS

Figure 1:
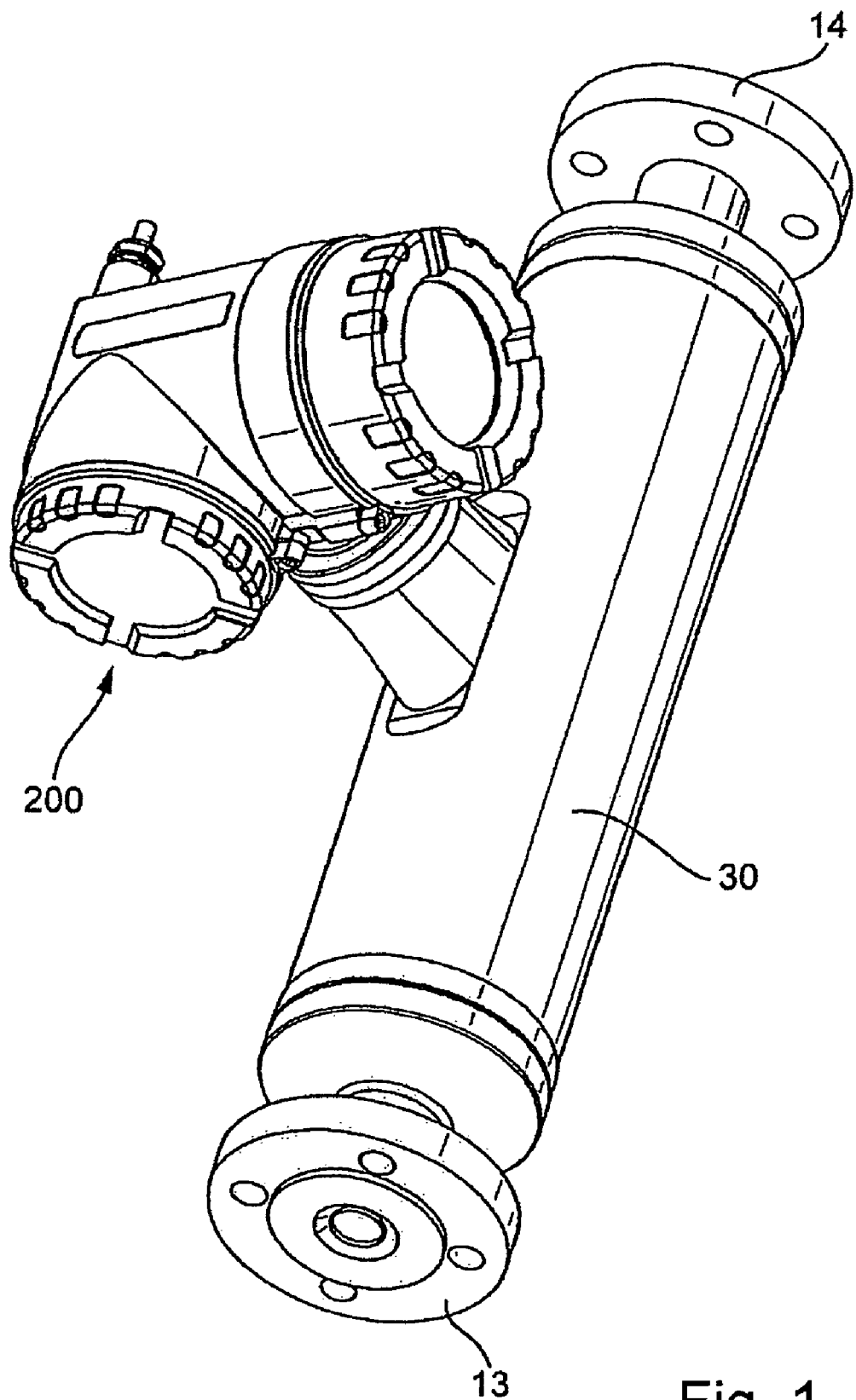
FIG. 1 an in-line measuring device joined into a pipeline for measuring at least one parameter of a medium conveyed in the pipeline.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIG. 1 shows an in-line measuring device, which can be joined into a pipeline (not shown). The measuring device can be, for example, an in-line measuring device embodied as a Coriolis mass flow measuring device, density measuring device, viscosity measuring device, or the like, which serves for measuring and/or monitoring at least one parameter, for example a mass flow, e.g. mass flow rate, a density, a viscosity, etc. of medium flowing in the pipeline. The inline measuring device includes for such purpose a measuring transducer of vibration-type, electrically connected to an operating and evaluating electronics (not shown) accommodated in a corresponding electronics housing 200. During operation, medium to be measured flows through the measuring transducer.

Figure 2:
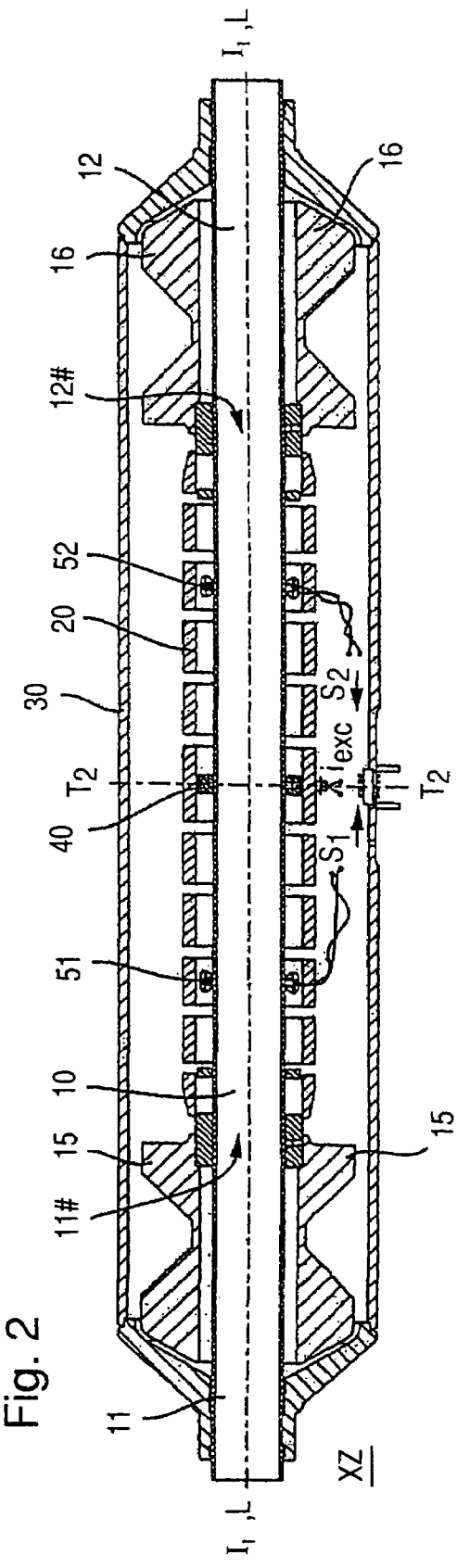
FIG. 2 sectioned, in side view, an example of a measuring transducer of vibration-type suitable for the in-line measuring device of FIG. 1 and including a measuring tube and a counteroscillator, as well as terminal outliers.
Figure 4:
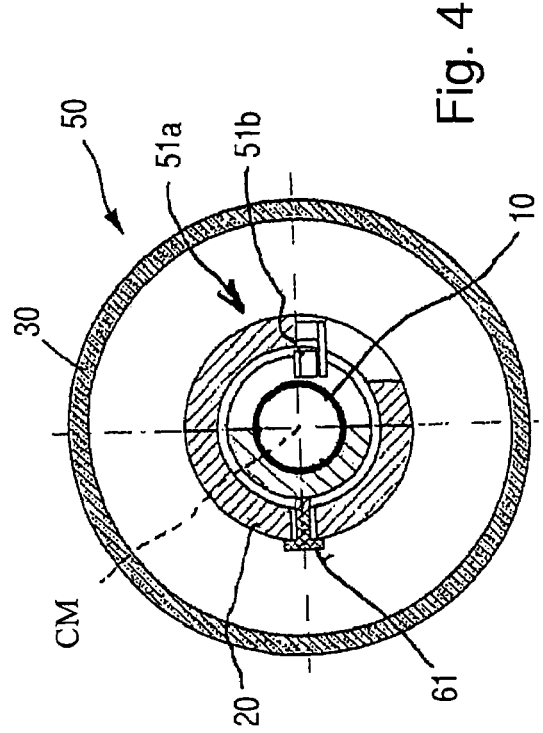
FIG. 4 the measuring transducer of FIG. 2 in another cross section and showing a spring element.
Figure 3:
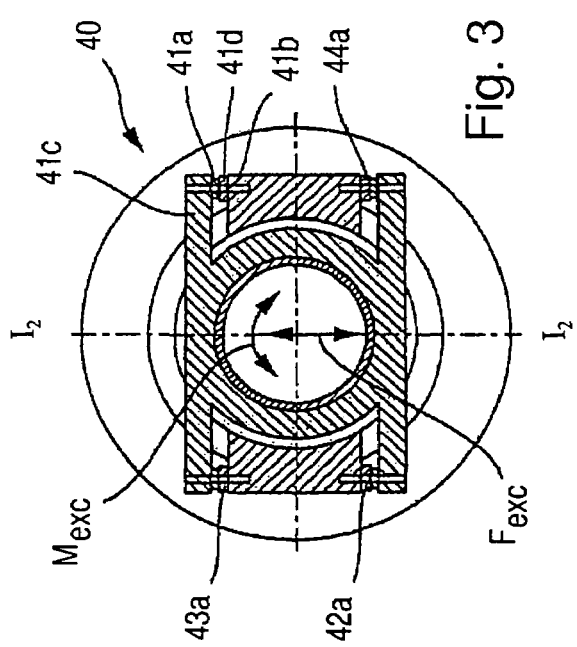
FIG. 3 the measuring transducer of FIG. 2 in a cross section.

FIGS. 2 to 4 show, by way of example, on the basis of a concrete example of an embodiment, principal construction of such a measuring transducer of vibration-type, schematically in different sectional views. Additionally, the principal mechanical structure of the measuring transducer as well as the manner of action of such structure, as shown by a way of example, are comparable with those of the measuring transducers shown in US-A 2007/0119265, US-A 2007/0119264, U.S. Pat. No. 6,691,583, U.S. Pat. No. 6,840,109. Further examples of embodiments of the measuring transducer of the invention, as well as also details thereof, are additionally shown in FIGS. 6a, 6b, 7a, 7b, 8a, 8b, as well as 9.

The measuring transducer serves for producing mechanical, reaction forces in a medium flowing therethrough, e.g. mass-flow-dependent, Coriolis forces, density-dependent, inertial forces and/or viscosity-dependent, frictional forces, which measurably, especially as registerable by sensor, react on the measuring transducer. Derived from these reaction forces, e.g. a mass flow m, a density $\rho$ and/or a viscosity $\eta$ can then be measured in manner known to those skilled in the art. For conveying the medium, the measuring transducer includes at least one measuring tube 10 (in the example of an embodiment shown here, a single, essentially straight, measuring tube 10), which, in operation, is caused to vibrate such that it is repeatedly elastically deformed to oscillate about a static rest position, wherein the measuring transducer has at least a first natural mode of oscillation, in which at least the measuring tube can execute bending oscillations in an imaginary, primary plane of oscillation XZ. This imaginary, primary plane of oscillation XZ corresponds, moreover, essentially also to the plane of the drawing of FIGS. 5a-5d. Besides the first, natural mode of oscillation in the imaginary, primary plane of oscillation XZ, the measuring transducer has, additionally however, inherently at least a second natural mode of oscillation, in which at least the measuring tube can execute bending oscillations in an imaginary, secondary plane of oscillation YZ essentially orthogonal to the imaginary, primary plane of oscillation XZ.

For minimizing disturbing influences acting on the measuring tube 10 as well as also for reducing oscillatory energy given off by the measuring transducer to the connected pipeline, provided additionally in the measuring transducer is a counteroscillator 20 (here extending essentially straight and essentially parallel to the measuring tube 10). This is, as also shown in FIG. 2, affixed to the measuring tube, associated with the formation, on the inlet side, of a first coupling zone 11# essentially defining an inlet end of the measuring tube 10 and associated with the formation, on the outlet side, of a second coupling zone 12# essentially defining an outlet end of the measuring tube 10. The counteroscillator 20 can be tubular or box-shaped and so connected on the inlet end and on the outlet end with the measuring tube 10 that it is, as quite usual in the case of such measuring transducers, essentially directed coaxially with the measuring tube 10 and such that the measuring tube 10 is, at least partially, surrounded by the counteroscillator 10. Additionally, it can be of advantage that the counteroscillator 20 is significantly heavier than the measuring tube 10.

For allowing medium to be measured to flow through, measuring tube 10 is connected, via an inlet tube piece 11 opening on the inlet side in the region of the first coupling zone and via an outlet tube piece 12, especially an outlet tube piece essentially identical to the inlet tube piece 11, opening on the outlet side in the region of the second coupling zone, to a pipeline (not shown) respectively supplying and draining the medium. Inlet tube piece 11 and outlet tube piece 12 are, in the illustrated example of an embodiment, essentially straight and aligned with the measuring tube 10, as well as with a longitudinal axis L essentially connecting the coupling zones. Advantageously, measuring tube 10 and inlet- and outlet-tube-pieces 11, 12 can be embodied as one piece, so that e.g. a single, tubular stock can serve for their manufacture. Instead of measuring tube 10, inlet tube piece 11 and outlet tube piece 12 being formed by segments of a single, one-piece tube, such can, in case required, however, also be manufactured by means of separate pieces of stock subsequently joined together, e.g. by welding.

In an embodiment of the invention, the measuring tube is additionally so embodied that it extends with essentially constant cross section, especially circular cross section, between the two coupling zones. Especially, it is additionally provided that the measuring tube 10 is formed essentially cylindrically.

During operation of the measuring transducer, measuring tube 10 is, as already mentioned in a number of instances above, so excited, at least at times, to execute lateral bending oscillations in the imaginary, primary plane of oscillation XZ, especially in the region of a natural resonance frequency of a corresponding, natural mode of oscillation, that it deflects in this so-called wanted mode at least partially, especially predominantly, according to a natural, first form of eigenoscillation. The bending oscillations in the wanted mode are, in such case, directed essentially transversely to a bending oscillation axis essentially parallel, especially coinciding, with the longitudinal axis L connecting the two coupling zones 11#, 12# imaginarily together. In an embodiment of the invention, in such case, it is further provided that the measuring tube is excited, at least at times during operation, by means of the exciter mechanism, in such a manner that it oscillates predominantly or exclusively in the imaginary, primary plane of oscillation.

Figure 5A:
FIGS. 5a-d schematically, bending lines of the measuring tube and counteroscillator, in each case oscillating in a lateral, bending oscillation mode in a primary plane of oscillation of the measuring transducer.
Figure 5B:
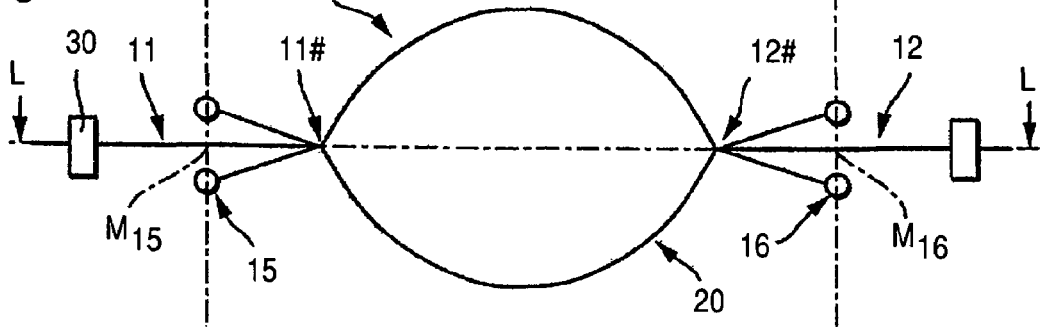
Figure 5C:
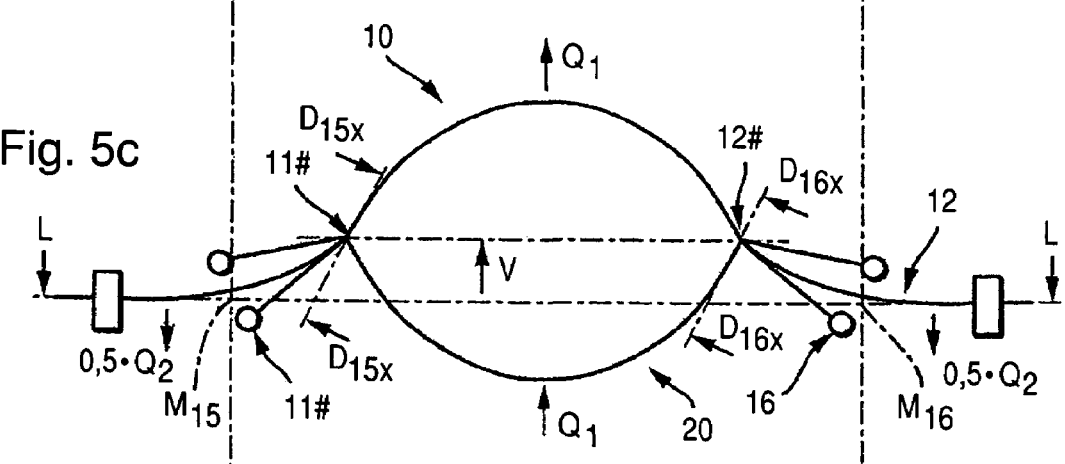
Figure 5D:
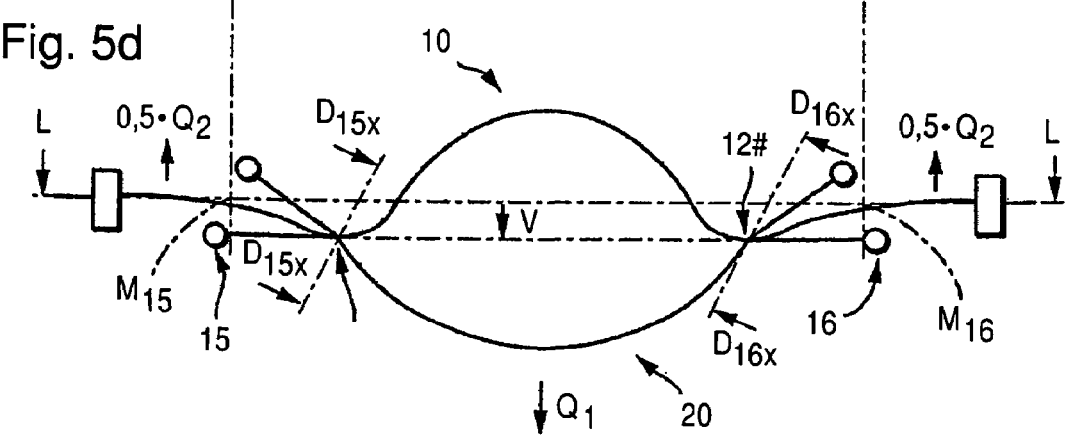

In a further embodiment of the invention, measuring tube 10 is, in such case, excited with an oscillation frequency, $f_{exc}$, corresponding as exactly as possible to a natural resonance frequency of the so-called f1-eigenmode of the measuring tube 10, thus a symmetric eigenmode at which, as illustrated schematically in FIGS. 5b to 5d, the vibrating measuring tube 10, through which medium is not flowing, is bent out essentially symmetrically with respect to a central axis perpendicular to the longitudinal axis L and, in such case, exhibits essentially a single oscillation antinode; compare, in such respect, for example, also the initially mentioned US-A 2007/0119265, US-A 2007/0119264, or U.S. Pat. No. 6,840,109. In the same way, also counteroscillator 20 is, as shown schematically in FIG. 5b, likewise excited to execute bending oscillations during operation of the measuring transducer; its bending oscillations are essentially coplanar with, but essentially opposite in phase to, the bending oscillations of measuring tube 10. In this way, measuring tube 10 and counteroscillator 20 thus oscillate during operation, at least at times and partially, laterally in a wanted mode, in which they execute jointly, essentially coplanar bending oscillations in the imaginary, primary plane of oscillation XZ.

For the case in which medium is flowing in the pipeline and, consequently, mass flow m is different from zero, Coriolis forces are induced in the through-flowing medium by means of the measuring tube 10 vibrating in the aforementioned manner. These, in turn, react on the measuring tube 10 and so effect an additional, sensorially registerable deformation (not shown) of the measuring tube 10 according to a natural, second form of eigenoscillation, which is essentially coplanarly superimposed on the excited, wanted mode. As a result, the measuring tube also oscillates in the Coriolis mode essentially in the imaginary, primary plane of oscillation XZ.

The instantaneous character of the deformation of measuring tube 10 is, in such case, especially as regards its amplitude, also dependent on the instantaneous mass flow m. Serving as second form of eigenoscillation, the so-called Coriolis mode, can be, as usual in the case of this type of measuring transducer, e.g. the form of eigenoscillation referred to as the anti-symmetric f2-eigenmode, thus that having two oscillation antinodes, and/or the form of eigenoscillation referred to as the anti-symmetric f4-eigenmode with four oscillation antinodes. In an embodiment of the invention, additionally, measuring tube 10 and counteroscillator 20 are so dimensioned that the empty measuring tube 10 has a lowest, natural eigenfrequency, $f_{10}$, which is greater than or about equal to, a lowest natural eigenfrequency, $f_{20}$, of the counteroscillator 20. Especially, measuring tube 10 and counteroscillator 20 are, in such case, so dimensioned that the measuring tube 10 filled with water has a lowest natural eigenfrequency, $f_{10,H2O}$, which is at least equal to a lowest natural eigenfrequency, $f_{20}$, of the counteroscillator 20. In a further embodiment of the invention, it is additionally provided that measuring tube 10 and counteroscillator 20 are so matched with respect to one another as regards their oscillatory properties that a lowest natural eigenfrequency, $f_{10,H2O}$, of the measuring tube 10 then corresponds to at least 1.1 times a lowest natural eigenfrequency, $f_{20}$, of the counteroscillator 20, when the measuring tube is completely filled with water. In the case of a measuring tube of titanium having a nominal diameter DN of about 55 mm, a length, $L_{10}$, of about 570 mm and a wall thickness of about 2.5 mm, a natural resonance frequency, $f_{10,air}$, of the f1-eigenmode of the empty measuring tube would lie at about 550 Hz, while a natural resonance frequency, $f_{10,H2O}$, of the f1-eigenmode of the measuring tube filled with water would amount to about 450 Hz.

In a further development of the invention, especially also based on the measuring transducer disclosed in U.S. Pat. No. 6,840,109, the measuring tube 10 further executes, during operation, at least at times, especially simultaneously with the aforementioned bending oscillations, torsional oscillations about a torsional oscillation axis essentially parallel with the longitudinal axis L, or with the aforementioned bending oscillation axis, as the case may be. Torsional oscillation axis, bending oscillation axis, as well as also the longitudinal axis L can, as quite usual in the case of such measuring transducers, be essentially coincident. For the above-described measuring tube 10, for example, a lowest natural resonance frequency for the torsional oscillations would be in the region of about 750 Hz.

For producing mechanical oscillations of the measuring tube 10, be they bending oscillations and/or torsional oscillations, the measuring transducer further includes an exciter mechanism 40, especially an electrodynamic exciter mechanism. This serves for converting an electrical exciter energy $E_{exc}$ fed by means of the operating and evaluating electronics in the form of a correspondingly conditioned, electric, driver signal, e.g. having a controlled current and/or a controlled voltage, into an exciter force $F_{exc}$ acting, e.g. in pulse form, clocked or harmonically, on the measuring tube 10 and elastically deforming such in the above-described manner. The exciter force $F_{exc}$ can, in such case, as shown schematically in FIG. 4, be embodied bi-directionally or, however, also unidirectionally and can be tuned in manner known to those skilled in the art as regards its amplitude e.g. by means of current- and/or voltage-control circuit and, as regards its frequency, e.g. by means of a phase control loop. Especially, the exciter mechanism is, as quite usual in the case of such measuring transducers, further so embodied and arranged in the measuring transducer that it acts on the measuring tube essentially centrally and/or is affixed thereto externally at least pointwise along an imaginary, central, peripheral line of the measuring tube.

The exciter mechanism can be e.g. a simple electrodynamic plunger-coil arrangement acting differentially on the measuring tube 10 and counteroscillator 20 and including a cylindrical exciter coil secured to the counteroscillator 20. During operation, an electrical, exciter current flows through the exciter coil. Additionally, the plunger-coil arrangement includes a permanently magnetic armature extending at least partially into the exciter coil and affixed externally, especially centrally, on the measuring tube 10. Alternatively, the exciter mechanism 40 can be implemented e.g. as an electromagnet or also as a seismic exciter.

For detecting oscillations of the measuring tube 10, e.g. a sensor arrangement usual for such measuring transducers can be used, wherein, in manner known to those skilled in the art, the movements of the measuring tube 10 are registered by means of an inlet-side, first oscillation sensor 50A placed spaced from the first coupling zone 11# on the measuring tube 10 and by means of an outlet-side, second oscillation sensor 50B, especially a second oscillation sensor 50B of essentially equal construction to that of oscillation sensor 50A, placed spaced from the second coupling zone 12# on the measuring tube 10, by way of which the registered movements are converted into corresponding first and second sensor signals $S_1$, $S_2$. Sensors 50A, 50B can be e.g. electrodynamic, velocity sensors measuring the oscillations e.g. differentially relative to the counteroscillator, or they can be electrodynamic, path sensors, or acceleration sensors. Instead of electrodynamic sensor arrangements or in supplementation thereof, additionally also optoelectronic sensors or sensors measuring by means of resistive or piezoelectric, strain measuring strips can serve for detecting the oscillations of the measuring tube 10.

In a further embodiment of the invention, the exciter mechanism 40 is, as shown schematically, for example, also in FIG. 2 or FIG. 3, so embodied and so arranged in the measuring transducer that it acts, during operation, simultaneously, especially differentially, on measuring tube 10 and counteroscillator 20.

In the example of an embodiment shown here, the exciter mechanism 40 includes for such purpose at least a first exciter coil 41a, through which an exciter current or an exciter current component flows, at least at times during operation, and which is affixed to a lever 41c connected with the measuring tube 10. Via the lever and an armature 41b affixed externally to the counteroscillator 20, the exciter coil acts differentially on the measuring tube 10 and the counteroscillator 20. This mechanism has, among other things, also the advantage that, on the one hand, the counteroscillator 20 and thus also the transducer housing 100 can be kept small in cross section and, in spite of this, the exciter coil 41a is easily accessible, especially also in the case of assembly. Moreover, a further advantage of this embodiment of the exciter mechanism 40 is that possibly used, coil cups 41d, no longer negligibly heavy in the case of nominal diameters of more than 50 mm, are likewise affixable to the counteroscillator 20 and, consequently, have, for practical purposes, no influence on the resonance frequencies of the measuring tube 10. It should, however, be indicated here that, in case necessary, the exciter coil 41a can also be held by the counteroscillator 20, in which case the armature 41b is attached to the measuring tube 10. Alternatively to or in supplementation of a differentially acting, exciter mechanism 40, the sensor arrangement 50 can also be so designed and arranged in the measuring transducer that it registers the vibrations of measuring tube 10 and counteroscillator 20 differentially.

In the example of an embodiment shown here, the sensor arrangement 50 includes a sensor coil 51a affixed to the measuring tube 10. Sensor coil 51a is arranged as near as possible to an armature 51b affixed to the counteroscillator 20 and so coupled with such magnetically that there is induced in the sensor coil a variable measurement voltage influenced by lateral movements between measuring tube 10 and counteroscillator 20 changing a relative separation between sensor coil and armature and/or rotational, relative movements between measuring tube and counteroscillator 20 changing a relative position of the sensor coil with respect to the armature. In case necessary, the sensor coils 51a can, for such purpose, however, also be affixed to the counteroscillator 20 and, in corresponding manner, the armature 51b coupled therewith can be affixed to the measuring tube 10.

In a further embodiment of the invention, it is additionally provided that the oscillation exciter and oscillation sensors are constructed according to the same principle of action, especially, they are essentially of equal construction. Furthermore, it is also possible to attach coils and/or armatures of the exciter mechanism and/or sensor arrangement directly to the measuring tube or to the counteroscillator and to omit the intermediating lever.

In a further embodiment of the invention, measuring tube 10, counteroscillator 20 and the sensor arrangement and exciter mechanism 40, 50 secured thereto are so matched to one another as regards their mass distribution that the so-formed, inner part of the measuring transducer suspended by means of the inlet and outlet tube pieces 11, 12 have a center of mass CM, which lies at least within the measuring tube 10, preferably however as near as possible to the longitudinal axis L of the measuring tube. Additionally, the inner part is further so constructed that it has a first principal axis of inertia I1 aligned with the inlet tube piece 11 and the outlet tube piece 12 and lying at least sectionally within the measuring tube 10. As a result of the positioning of the center of mass CM of the inner part, especially however also due to the above-described position of the first principal axis of inertia I1, the torsional oscillations and the bending oscillations of the measuring tube 10 are to a largest extent mechanically decoupled from one another, at least in the wanted mode.

The inner part of the measuring transducer is, in a further embodiment of the invention, so constructed, that a first principal axis of inertia I1 thereof essentially coincides with the above-mentioned, longitudinal axis L. Additionally, in a further embodiment of the invention, the inner part of the measuring transducer is so constructed that a second principal axis of inertia I2 thereof essentially coincides with the above-mentioned, central axis.

The inner part of the measuring transducer formed by means of the measuring tube 10, the counteroscillator 20, the inlet tube piece 11 and the outlet tube piece 12 is, as evident from the combination of FIGS. 1 and 2, additionally held oscillatably in a transducer housing 30 surrounding such inner part, tightly to leakage of medium and also, within limits, pressure tightly. Transducer housing 30 is appropriately affixed on the respective ends of the in- and out-let tube pieces 11, 12 away from their respective coupling zones. For the case in which the measuring transducer is to be assembled with the pipeline releaseably, first and second flanges 13, 14 are provided on the inlet tube piece 11 and the outlet tube piece 12, respectively. Flanges 13, 14 can, in such case, at the same time, be embodied as integral components of the transducer housing 30. In case necessary, the in- and out-let tube pieces 11, 12 can, however, also be connected directly with the pipeline, e.g. by means of welding or brazing.

For electrically connecting the exciter mechanism as well as also the sensor arrangement to the mentioned operating and evaluating electronics of the in-line measuring device, furthermore, corresponding connecting lines are provided, which are guided, at least sectionally, within the transducer housing. The connecting lines can, in such case, be embodied at least partially, as electrical line wires at least sectionally encased in, and by, electrical insulation. For example, they can be "twisted-pair"-lines, flat tape cables and/or coaxial cables. Alternatively thereto or in supplementation thereof, the connecting lines can be formed, at least sectionally, also by means of conductive traces of a circuit board, especially a flexible circuit board, which may be a lacquered circuit board.

In a further embodiment of the invention, the measuring transducer of the invention additionally includes, as also evident from the combination of FIGS. 2 and 5a to 5d, for further improving accuracy of measurement and based on the measuring transducers proposed in the initially mentioned US-A 2007/0186685, US-A 2007/0119265, US-A 20070/119264, U.S. Pat. No. 6,691,583, or U.S. Pat. No. 6,840,109, a first outlier 15 coupled with the inlet tube piece 11 and the measuring tube 10 in the region of the first coupling zone and having, as shown schematically in FIG. 5a, a center of mass M15 lying in the region of the inlet tube piece 11, as well as a second outlier 16 coupled with the outlet tube piece 12 and the measuring tube 10 in the region of the second coupling zone and having, as likewise shown schematically in FIG. 5a, a center of mass M16 lying in the region of the outlet tube piece 12. In other words, the two outliers 15, 16, especially outliers of essentially equal construction, which may also be identical to one another, are so arranged in the measuring transducer that the respective centers of mass M15, M16 are spaced from the measuring tube 10. Especially, the centers of mass M15, M16 are aligned with the measuring tube 10. The two outliers 15, 16 are, thus, as a result, mounted eccentrically on the inlet and outlet tube pieces and, correspondingly, eccentrically also with respect to the measuring tube 10 and counteroscillator 20. The manner, in which the so-formed inner part acts, corresponds, in such case, to that of the inner parts shown in the mentioned US-A 2007/0186685, US-A 2007/0119265, US-A 20070/119264, U.S. Pat. No. 6,691,583, or U.S. Pat. No. 6,840,109.

In order to enable as simple and cost-favorable manufacture of the outliers, as well as, finally, the measuring transducer, as possible, each of the two outliers 15, 16 can be embodied to be essentially tubular, or sleeve-shaped, so that each can be formed essentially by means of a sleeve, especially a metal sleeve, which is pushed onto the counteroscillator 20, especially after the counteroscillator 20 has already been connected with the measuring tube 10. In a further development thereof, each of the sleeves, in such case, forming the respective outliers 15, 16 has at least one annular groove; compare, for this, also the mentioned US-A 2007/0186685, US-A 2007/0119265 or US-A 20070/119264.

For manufacturing measuring tube, in- and out-let tube pieces, counteroscillator, as well as the outliers provided on occasion, practically any material usual for such measuring transducers, such as e.g. steel, titanium, tantalum, zirconium, etc., or also appropriate combinations of these materials, can be used. For example, the application of titanium has proved as especially suitable for the measuring tube 10, as well as the inlet tube piece 11 and the outlet tube piece 12, while, for example, for reasons of cost savings, the application of steel is quite advantageous both for the counteroscillator 20 as well as for the possibly provided outliers 15, 16, as well as also for the transducer housing 30.

As already mentioned, in the case of measuring transducers of the aforementioned kind, especially in the case of those having a straight measuring tube, a special problem is that the measuring transducer can exhibit not only natural modes of oscillation both in the imaginary, primary plane of oscillation XZ as well as also in the imaginary, secondary plane of oscillation YZ orthogonal thereto, but also that, additionally, also at least some of the modes of oscillation in the secondary plane of oscillation YZ can exhibit such a natural resonance frequency that can be essentially equal to a natural resonance frequency of a corresponding mode of oscillation in the primary plane of oscillation XZ. Such modes of oscillation corresponding to one another can, additionally, also have forms of oscillation of equal order, thus of equal number of oscillation antinodes.

In view of this situation, the measuring transducer of the invention includes, additionally, a first spring element 61 and a second spring element 62. Each of these at least two spring elements, for example spring elements of essentially equal construction, is, in such case, as also shown schematically in FIGS. 6a to 8b, affixed with a measuring-tube-side, first end to the measuring tube 10, and, with a counteroscillator-side, second end to the counteroscillator 20, for example, in each case at equal distance from the middle of the measuring tube. The spring elements are, according to the invention, in such case so arranged in the measuring transducer that each of the two spring elements 61, 62 is connected both with the measuring tube and with the counteroscillator spaced from the two coupling zones 11#, 12# as well as also from the exciter mechanism 40, and, as a result, acts on measuring tube and counteroscillator spaced from the two coupling zones 11#, 12# and from the exciter mechanism 40. Preferably, the first spring element 61 is in such case, affixed to the measuring tube and counteroscillator spaced from the second spring element 62, so that, thus, both the measuring-tube-side ends as well as also the counteroscillator-side ends of the two spring elements 61, 62 are, in each case, spaced from one another.

Especially, it is additionally provided that the spring elements 61, 62 are, in each case, affixed to the measuring tube with their measuring-tube-side, first ends to form, in each case, an essentially rigid and/or essentially play-free seating on the measuring tube and to the counteroscillator with their counteroscillator-side, second ends to form, in each case, an essentially rigid and/or essentially play-free seating on the counteroscillator.

As regards the actual positioning and the number of these spring elements applied within the measuring transducer, there are, now, various possibilities of shape and variation, of which some selected ones will now be explained in greater detail as follows.

Figure 6A:
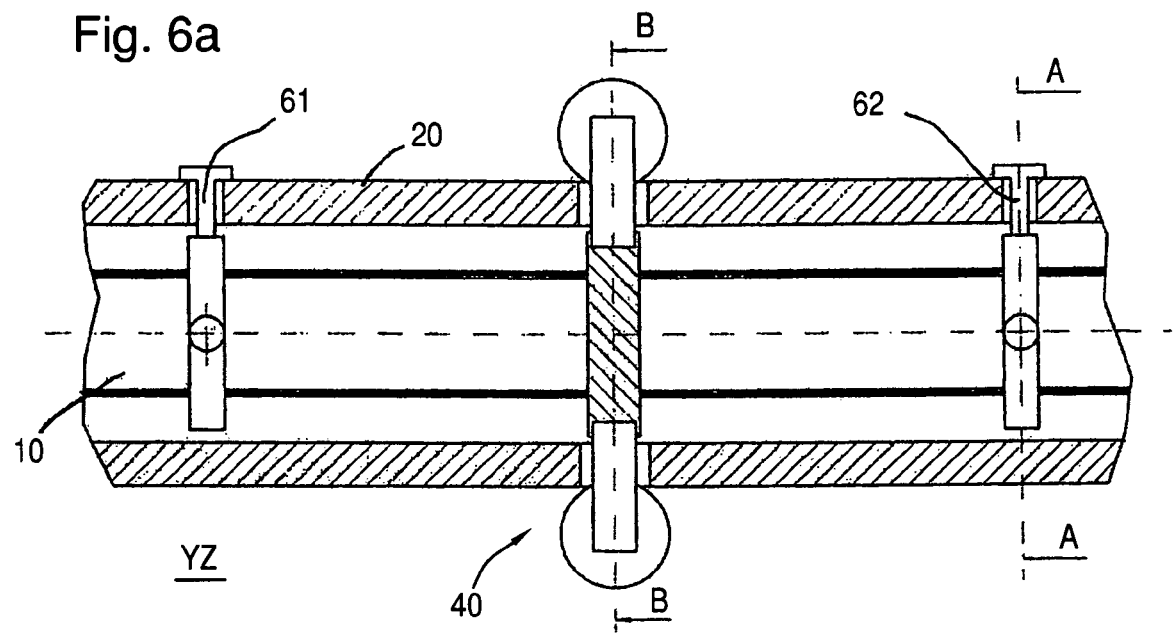
FIGS. 6a, b in two different, sectioned views, a variant for a measuring transducer of FIG. 2 with two spring elements.
Figure 6B:
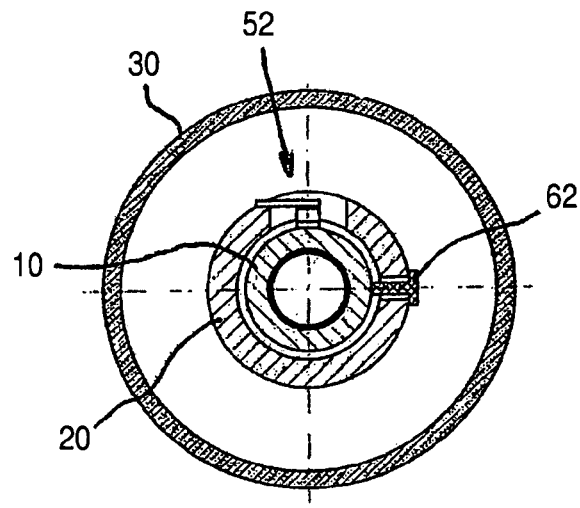
Figure 7A:
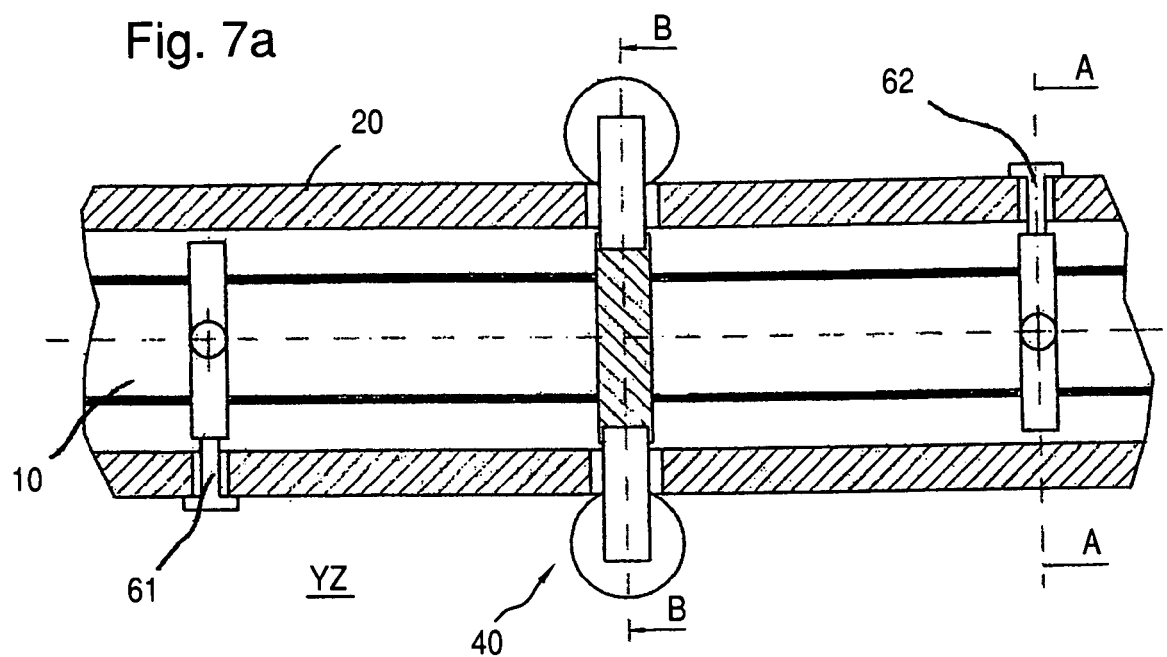
FIGS. 7a, b in two different, sectioned views, another variant for a measuring transducer of FIG. 2 with two spring elements.
Figure 8A:
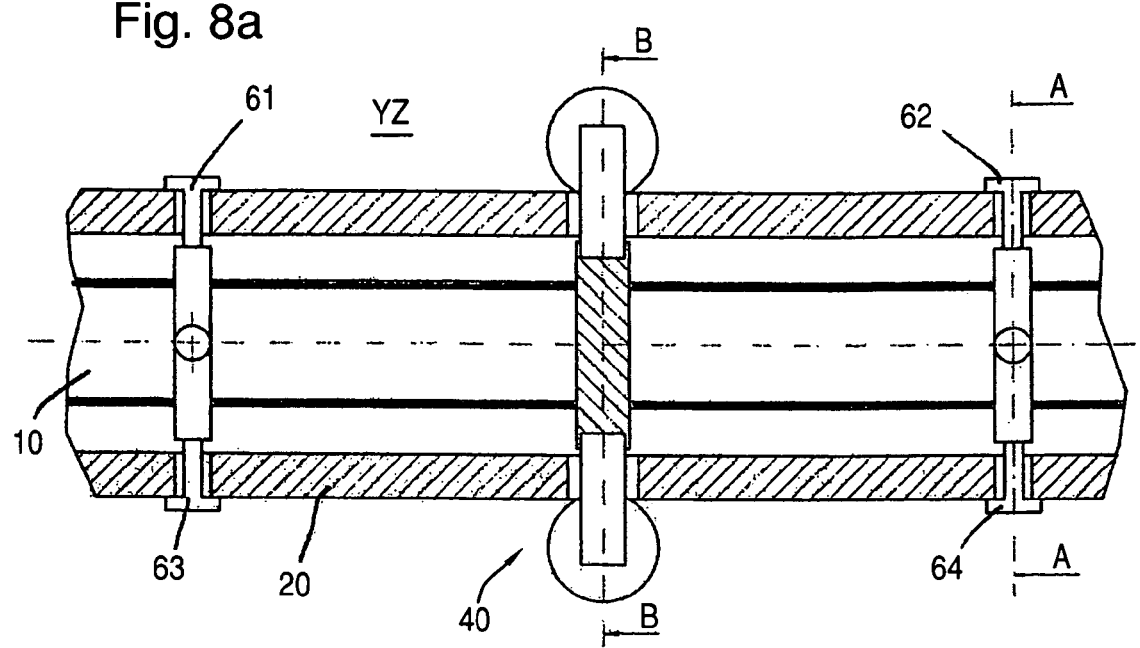
FIGS. 8a, b in two different, sectioned views, a further variant for a measuring transducer of FIG. 2, with four spring elements.
Figure 8B:
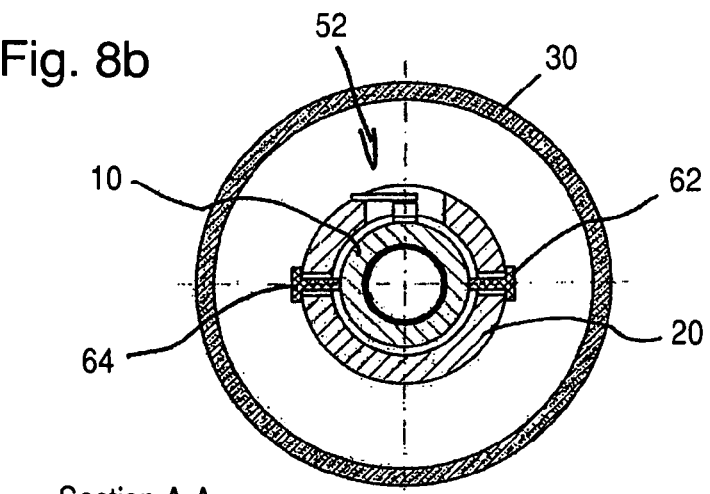

In a further embodiment of the invention, as also, in each case, schematically illustrated in the FIGS. 6a, 7a and 8a, the first spring element is affixed to measuring tube and counteroscillator in an inlet-side region lying between the first coupling zone 11# and the at least one oscillation exciter. Developing this embodiment of the invention further, it is additionally provided that the second spring element is affixed to measuring tube and counteroscillator in an outlet-side region lying between the second coupling zone 12# and the at least one oscillation exciter.

Figure 7B:
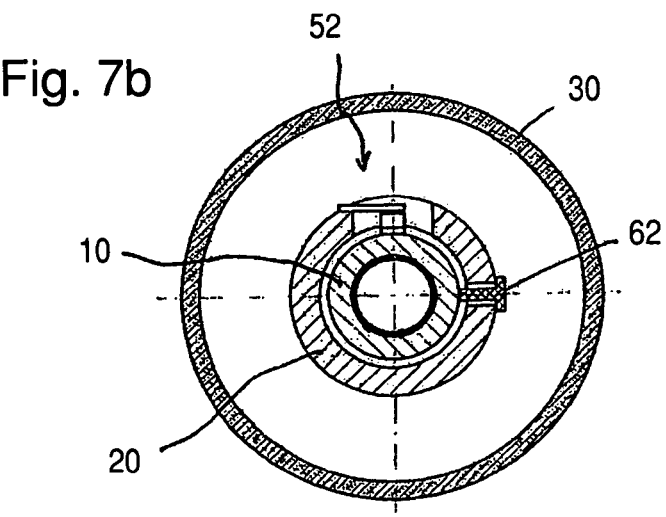

According to a further embodiment of the invention, it is additionally provided that the spring elements 61, 62, as also evident from the combination of FIGS. 7a and 7b, are arranged in the measuring transducer in such a manner that the first spring element 61 is affixed to the measuring tube 10 along a imaginary, lateral line of the measuring tube 10 extending parallel to the longitudinal axis L and lying essentially diametrically opposite to an imaginary, lateral line of the measuring tube 10 likewise parallel thereto and along which the second spring element 62 is affixed to the measuring tube with its measuring-tube-side end. Especially, in such case, it is further provided that the two spring elements 61, 62 are also arranged point-symmetrically in the measuring transducer with reference to a center of gravity of the measuring tube 10 or also the mentioned center of mass CM of the measuring transducer. In other words, the measuring-tube-side ends of the two spring elements 61, 62 lie advantageously on a common, imaginary diagonal of the measuring transducer passing through the center of gravity; equally, then, also the counteroscillator-side ends of the two spring elements 61, and 62 lie on a common, additional, imaginary diagonal of the measuring transducer passing through the center of gravity. This arrangement of the spring elements has, among other things, the advantage that, in this way, not only the frequency displacements between resonance frequencies of corresponding modes of oscillation in the primary and secondary planes of oscillation can be very effectively achieved, but, also, additionally, in very simple manner, an additional frequency shifting between the resonance frequencies of the mentioned torsional oscillations of the measuring tube as well as those of the lateral oscillations, especially those in the primary plane of oscillation, can be realized, without, in this way, significantly hindering the exciting of the torsional oscillations per se.

In an embodiment of the invention, the at least two spring elements 61, 62 are so embodied and so arranged in the measuring transducer that, by means of the two spring elements, a lowest eigenfrequency of the above mentioned, first, natural mode of oscillation in the imaginary primary plane of oscillation is set smaller then a lowest eigenfrequency of the second natural mode of oscillation in the imaginary, secondary plane of oscillation. Especially, in such case, it is further provided, so to construct the measuring transducer that a frequency spacing between the lowest eigenfrequency of the first, natural mode of oscillation and the lowest eigenfrequency of the second, natural mode of oscillation is set greater than 50 Hz, especially greater than 100 Hz.

In a further embodiment of the invention it is therefore additionally provided that each of the two spring elements 61, 62 has a spring stiffness, of which, in each case, a primary component constraining bending oscillations of the measuring tube in the primary plane of oscillation XZ is different from a secondary component constraining bending oscillations of the measuring tube in the secondary plane of oscillation YZ. Especially, it is, in such case, provided that each of the two spring elements 61, 62 is so embodied and so arranged in the measuring transducer that the primary component of its spring stiffness is in each case smaller than the associated secondary component.

Figure 9:
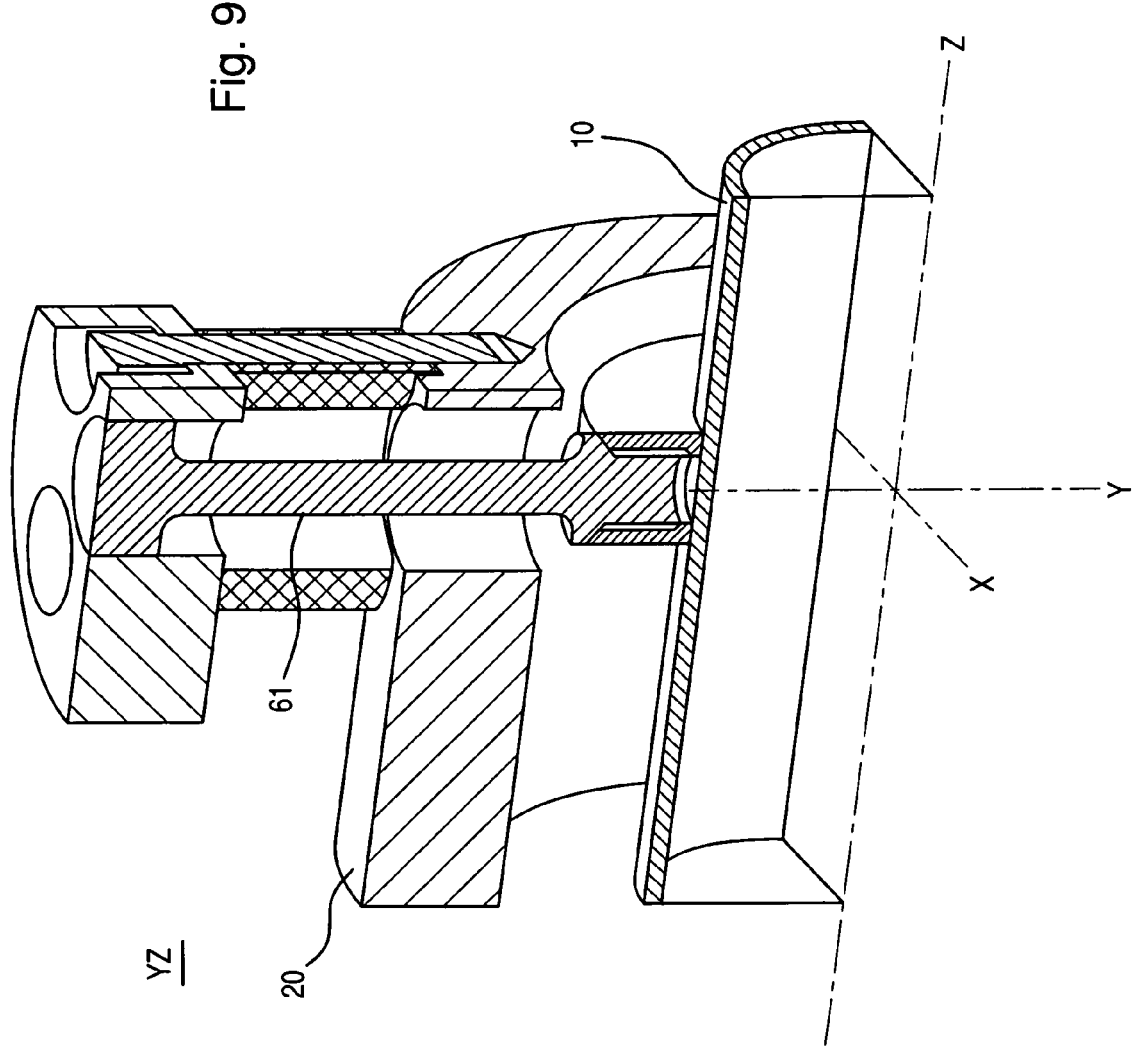
FIG. 9 schematically, a detail of a measuring transducer of FIG. 2 with a spring element secured to measuring tube and to counteroscillator.

The aforementioned difference between primary and associated secondary component can be achieved for the particular spring element, for example, in simple manner, as evident, by way of example, from the combination of the FIGS. 6a and b or as shown by way of example in FIG. 9 on the basis of the first spring element 61, by constructing each of the spring elements as an elongated body, such as a bar, a spiral spring, a leaf spring or the like and by, in each case, so arranging it in the measuring transducer that it is deflected during operation, as a result of bending oscillations of the measuring tube 10 in the primary plane of oscillation, transversely to a longitudinal axis imaginarily connecting both of the spring element ends in the manner of a string clamped at both ends.

In a further, advantageous embodiment, accordingly, each of the spring elements, especially the spring elements of equal construction, is, in each case, formed by means of a bar, especially a metal bar. Application of a metal bar as a spring element has, apart from providing, in this way, a relatively simple, yet quite robust construction of the spring elements, while simultaneously providing very good spring action, essentially the advantage that, in the manufacture, standardized, and, as a result, cost favorable, mass produced material can be directly made use of.

Further, the spring elements in another embodiment of the invention are so arranged in the measuring transducer that each of the spring elements constructed in the form of an elongated body, especially bar or rod-shaped spring elements, extends essentially in the radial direction toward the measuring tube and or counteroscillator. Alternatively thereto, it can, however, also be quite advantageous, especially in the case of operating temperatures which fluctuate to a considerable degree and, associated therewith, changes of the relative spacing between measuring tube and counteroscillator caused by thermally related expansions in the radial direction, when such rod-shaped spring element is inclined relative to the measuring tube 10 or its longitudinal axis L and/or slightly curved and consequently, is slightly resilient radially.

In another embodiment of the invention, the two spring elements are so placed in the measuring transducer that each of the two spring elements is arranged in a flat cutting plane extending imaginarily through the inlet-side region and the outlet-side region. Alternatively thereto or in supplementation thereof, it is further provided that each of the two spring elements, for example the spring elements of rod or bar shape, is seated partially at imaginary points of intersection of the measuring tube with the imaginary secondary plane of oscillation YZ. Additionally, it is provided that each of the two spring elements is seated in part, at imaginary points of intersection of the counteroscillator with the secondary plane of oscillation YZ. For the case in which the spring elements are, in each case, embodied in the form of essentially elongated bodies and seated, on the one hand, in each case, at imaginary points of the intersection of the measuring tube with the imaginary, secondary plane of oscillation and, on the other hand, in each case, at imaginary points of the intersection of the counteroscillator with the secondary plane of oscillation YZ, both are preferably so arranged in the measuring transducer that they lie effectively within the secondary plane of oscillation YZ.

In a further embodiment of the invention, the spring elements are additionally so arranged in the measuring transducer that the first spring element is affixed to the measuring tube at least in the vicinity of an inlet-side, peripheral line of the measuring tube, along which the mentioned, first oscillation sensor effectively registers, here, inlet-side movements of the measuring tube and that the second spring element is affixed to the measuring tube at least in the vicinity of an outlet-side, peripheral line of the measuring tube, along which the mentioned, second oscillation sensor effectively registers, here, outlet-side movements of the measuring tube. Further optimizing this embodiment, the spring elements are additionally so arranged in the measuring transducer that the first spring element and the mentioned, first oscillation sensor are affixed to the measuring tube in each case in part along at least the, to such extent, common, inlet-side, peripheral line of the measuring tube and that the second spring element and the mentioned, second oscillation sensor are affixed to the measuring tube in each case in part along at least the, to such extent, common, outlet-side, peripheral line of the measuring tube. This is of special advantage for so extremely effectively suppressing undesired measuring tube oscillations in the secondary plane of oscillation, at least at the associated oscillation sensor. In the case of rod- or bar-shaped spring elements, these undesired measuring tube oscillations can even be almost completely avoided. As a result of this, in very simple, equally very effective, manner, an in-coupling of mechanical disturbances, e.g. disturbances introduced from outside of the measuring transducer and acting in the secondary plane of oscillation, into the oscillation signals delivered by the oscillation sensors can be almost completely and surely prevented. This enables, for example, also the application of oscillation sensors having a certain transverse sensitivity to oscillations within the secondary plane of oscillation and which can, therefore, be manufactured more cost favorably due to their having a comparatively simpler construction.

According to a further embodiment, it is additionally provided that the spring elements are affixed to the measuring tube along a neutral fiber thereof essentially non-distorting when the measuring tube is undergoing bending oscillations in the primary plane of oscillation. For the above-described case in which also the counteroscillator executes during operation, at least at times, bending oscillations about the bending oscillation axis, it is further provided that the spring elements are affixed to the counteroscillator along a neutral fiber of the counteroscillator essentially non-distorting when the counteroscillator is undergoing bending oscillations. Securement of the spring elements along the neutral fibers of measuring tube and counteroscillator can, for example, also be achieved when a spring stiffness of the spring elements effectively constraining the torsional oscillations of the measuring tube about the torsional oscillation axis essentially coinciding with the bending oscillation axis is minimized, such that it has only a small effect on the behavior of the measuring transducer in the case of the measuring tube undergoing torsional oscillations.

Further examples for suitable structural embodiments of the spring elements and/or their arrangement relative to primary and secondary planes of oscillation are, moreover, also shown in the initially mentioned U.S. Pat. No. 5,291,792 or U.S. Pat. No. 7,077,014 or also in U.S. Pat. No. 4,823,614.

In a further development of the invention, the measuring transducer includes, as also shown schematically in FIG. 8a, further, an additional, third spring element 63, as well as a fourth spring element 64. The spring elements, for example again essentially of equal construction, are also in this case again so arranged in the measuring transducer that each of the now four spring elements 61, 62, 63, 64, is, as also evident from the combination of FIGS. 2 and 8a, affixed to the measuring tube 10 and counteroscillator 20 spaced both from the coupling zones 11#, 12# as well as also from the exciter mechanism 40. Especially, the spring elements 61, 62, 63, 64 are, in such case, so arranged in the measuring transducer that each of the four spring elements is additionally, in each case, spaced from each of the, respectively, other three spring elements. Especially, the spring elements are, in such case, so arranged that, as directly evident from the combination of FIGS. 8a and 8b, pairwise-associated, spring elements, here, thus, the first and the third spring elements 61, 63, on the one hand, and the second and fourth spring elements 62, 64, on the other hand, in each case lie essentially diametrically opposite to one another.

As can be recognized without difficulty from the above explanations, the measuring transducer of the invention is distinguished by its large number of tuning possibilities, which make possible for those skilled in the art, with knowledge of the present invention, to achieve, with high quality, a separation of resonance frequencies of selected modes of oscillation of the measuring tube in the primary and secondary planes of oscillation, especially also following the specification of external or internal, installed dimensions of the measuring transducer. The parameters, which are, in detail, to be set for the actual implementation, for the required the stiffness of the spring elements as well as also their particular, optimum positioning in the measuring transducer, can, in such case, be directly, appropriately matched to the actually provided nominal diameter DN for the measuring tube 10, as well as also the installed length for the measuring tube. The measuring transducer of the invention is, in such case, well suited both for measuring tubes with rather small nominal diameters DN in the range of smaller than 40 mm as well as also, especially, for application in pipelines having a caliber of more than 50 mm and, associated therewith, also for measuring tubes with nominal diameters of essentially more than 40 mm.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A measuring transducer of the vibration-type for a medium flowing in a pipeline, said the measuring transducer comprising:

a measuring tube vibrating, at least at times, and serving for conveying medium to be measured, said measuring tube showing an inlet-side and an outlet-side;

a counteroscillator affixed on said inlet-side of said measuring tube, to form a first coupling zone, and on said outlet-side of said measuring tube, to form a second coupling zone;

an exciter mechanism, for driving at least said measuring tube;

a sensor arrangement for registering oscillations at least of said measuring tube; and a first spring element and a second spring element, wherein:

said measuring tube executes during operation, at least at times and/or at least in part, bending oscillations about an imaginary bending oscillation axis imaginarily connecting the two coupling zones together; and each of said at least two spring elements is affixed to said measuring tube and said counteroscillator spaced both from each of said two coupling zones as well as also from said exciter mechanism.

2. The measuring transducer as claimed in claim 1, wherein:
the measuring transducer possesses at least a first, natural mode of oscillation, in which at least said measuring tube can execute bending oscillations in an imaginary, primary plane of oscillation.

3. The measuring transducer as claimed in claim 2, wherein:
the measuring transducer possesses a second, natural mode of oscillation, in which at least said measuring tube can execute bending oscillations in an imaginary, secondary plane of oscillation essentially orthogonal to said imaginary, primary plane of oscillation.

4. The measuring transducer as claimed in claim 3, wherein:
by means of said two spring elements, a lowest eigenfrequency of said first, natural mode of oscillation is set smaller than a lowest eigenfrequency of said second, natural mode of oscillation.

5. The measuring transducer as claimed in claim 4, wherein:
a frequency separation between the lowest eigenfrequency of said first natural mode of oscillation and the lowest eigenfrequency of said second natural mode of oscillation is set greater than 50 Hz, especially greater than 100 Hz.

6. The measuring transducer as claimed in claim 3, wherein:
each of said two spring elements exhibits a spring stiffness, of which, in each case, a primary component constraining bending oscillations of said measuring tube in said primary plane of oscillation differs from a secondary component constraining bending oscillations of said measuring tube in said secondary plane of oscillation.

7. The measuring transducer as claimed in claim 6, wherein:
each of said two spring elements is so constructed and so arranged in said measuring transducer that said primary component of its spring stiffness is, in each case, smaller than the associated said secondary component.

8. The measuring transducer as claimed in claim 3, wherein:
each of said two spring elements is seated, in part, on imaginary points of intersection of said measuring tube with said secondary plane of oscillation.

9. The measuring transducer as claimed in claim 3, wherein:
each of said two spring elements is seated, in part, on imaginary points of intersection of said counteroscillator with said secondary plane of oscillation.

10. The measuring transducer as claimed in claim 2, wherein:
said measuring tube is excited during operation by means of said exciter mechanism, at least at times, in such a manner that it oscillates, at least partially, especially predominantly or exclusively, in said imaginary, primary plane of oscillation.

11. The measuring transducer as claimed in claim 10, wherein:
said exciter mechanism is fed during operation, at least at times, by an electrical, driver signal.

12. The measuring transducer as claimed in claim 1, wherein:
said exciter mechanism includes at least one oscillation exciter, especially a single oscillation exciter and/or an oscillation exciter formed by means of a coil.

13. The measuring transducer as claimed in claim 12, wherein:
said first spring element is affixed to said measuring tube and said counteroscillator in said inlet-side region lying between said first coupling zone and said at least one oscillation exciter.

14. The measuring transducer as claimed in claim 13, wherein:
said first spring element is affixed to said measuring tube and said counteroscillator spaced from said second spring element.

15. The measuring transducer as claimed in claim 14, wherein:
said second spring element is affixed to said measuring tube and said counteroscillator in said outlet-side region lying between said second coupling zone and said at least one oscillation exciter.

16. The measuring transducer as claimed in claim 15, wherein:
said two spring elements are arranged in the measuring transducer in a flat cutting plane imaginarily extending through said inlet-side region and said outlet-side region.

17. The measuring transducer as claimed in claim 1, wherein:
the two spring elements are arranged in the measuring transducer point symmetrically with reference to a center of gravity of said measuring tube.

18. The measuring transducer as claimed in claim 1, wherein:
said exciter mechanism includes at least one coil.

19. The measuring transducer as claimed in claim 18, wherein:
said at least one coil of said exciter mechanism is mechanically connected, especially rigidly coupled, with said counteroscillator.

20. The measuring transducer as claimed in claim 1, wherein:
said sensor arrangement includes an inlet-side, first oscillation sensor, especially a first oscillation sensor formed by means of a coil, and an outlet-side, second oscillation sensor, especially a second oscillation sensor formed by means of a coil.

21. The measuring transducer as claimed in claim 20, wherein:
said first spring element and said first oscillation sensor are, in each case, affixed, in part, to said measuring tube along at least one, common, inlet-side, peripheral line of said measuring tube; and
said second spring element and said second oscillation sensor are, in each case, affixed, in part, to said measuring tube along at least one, common, outlet-side, peripheral line of said measuring tube.

22. The measuring transducer as claimed in claim 1, wherein:
said measuring tube and said counteroscillator are arranged essentially coaxially with respect to one another.

23. The measuring transducer as claimed in claim 1, wherein:
said measuring tube is at least partially surrounded by said counteroscillator.

24. The measuring transducer as claimed in claim 1, wherein:
said counteroscillator is essentially tubular.

25. The measuring transducer as claimed in claim 1, wherein:
said counteroscillator is essentially straight.

26. The measuring transducer as claimed in claim 1, wherein:
said measuring tube is essentially straight.

27. The measuring transducer as claimed in claim 26, wherein:
said counteroscillator also executes during operation, at least at times, bending oscillations about the bending oscillation axis; and
said spring elements are affixed to said counteroscillator along a neutral fiber of said counteroscillator essentially non-distorting when said counteroscillator is executing bending oscillations.

28. The measuring transducer as claimed in claims 26, wherein:
said measuring tube executes during operation, at least at times, torsional oscillations about a torsional oscillation axis essentially parallel to, especially coincident with, the bending oscillation axis.

29. The measuring transducer as claimed in claim 1, wherein:
said measuring tube extends between said two coupling zones with essentially constant cross section, especially a constant cross section of circular shape.

30. The measuring transducer as claimed in claim 1, wherein:
said measuring tube is formed essentially cylindrically.

31. The measuring transducer as claimed in claim 1, wherein:
said spring elements are affixed, in each case, to said measuring tube with a measuring-tube-side, first end, especially whereby, in each case, a rigid and/or play-free seating is formed, and to said counteroscillator with a counteroscillator-side, second end, especially whereby, in each case, a rigid and/or play-free seating is formed.

32. The measuring transducer as claimed in claim 1, wherein:
each of said spring elements, especially spring elements of equal construction, is formed, in each case, by means of a bar, especially a bar arranged extending in the measuring transducer essentially in the radial direction toward said measuring tube and/or said counteroscillator and/or a metal bar.

33. The measuring transducer as claimed in claim 1, further comprising:
a third spring element and a fourth spring element, wherein each of the four spring elements is affixed to said measuring tube and said counteroscillator spaced from said coupling zones and said exciter mechanism.

34. The measuring transducer as claimed in claim 33, wherein:
each of said four spring elements, especially spring elements of equal construction, is spaced from each of the, respectively, the other three spring elements.

35. The measuring transducer as claimed in claim 34, wherein:
pair-wise associated, inlet-side, spring elements are, in each case, placed on said measuring tube lying essentially diametrically opposite one another, and pair-wise associated, outlet-side spring elements are placed, in each case, on said measuring tube lying essentially diametrically opposite to one another.

36. The measuring transducer as claimed in claim 1, wherein:
said measuring tube communicates with the pipeline via an inlet tube piece opening on said inlet-side and via an outlet tube piece opening on said outlet-side.

37. The measuring transducer as claimed in claim 36, further comprising:
a transducer housing affixed to said inlet tube piece and to said outlet tube piece.

38. The measuring transducer as claimed in claim 1, further comprising:
a transducer housing.

39. The use of a measuring transducer, as claimed in claim 1, in one of:
an in-line measuring device, especially a Coriolis mass flow measuring device, a density measuring device, a viscosity measuring device, or the like, for measuring and/or monitoring at least one parameter, especially a mass flow, m, a density, $\rho$, and/or a viscosity, $\eta$, of a medium flowing in a pipeline.

40. The measuring transducer as claimed in claim 1, wherein:
the exciter mechanism acts on the measuring tube essentially centrally.

41. The measuring transducer as claimed in claim 1, wherein:
the exciter mechanism is attached externally to the measuring tube at least pointwise along an imaginary, central, peripheral line of the measuring tube.

* * * * *